Nov. 15, 1938.  E. R. MAURER  2,136,721
POWER TRANSMISSION
Filed July 15, 1935  2 Sheets-Sheet 2
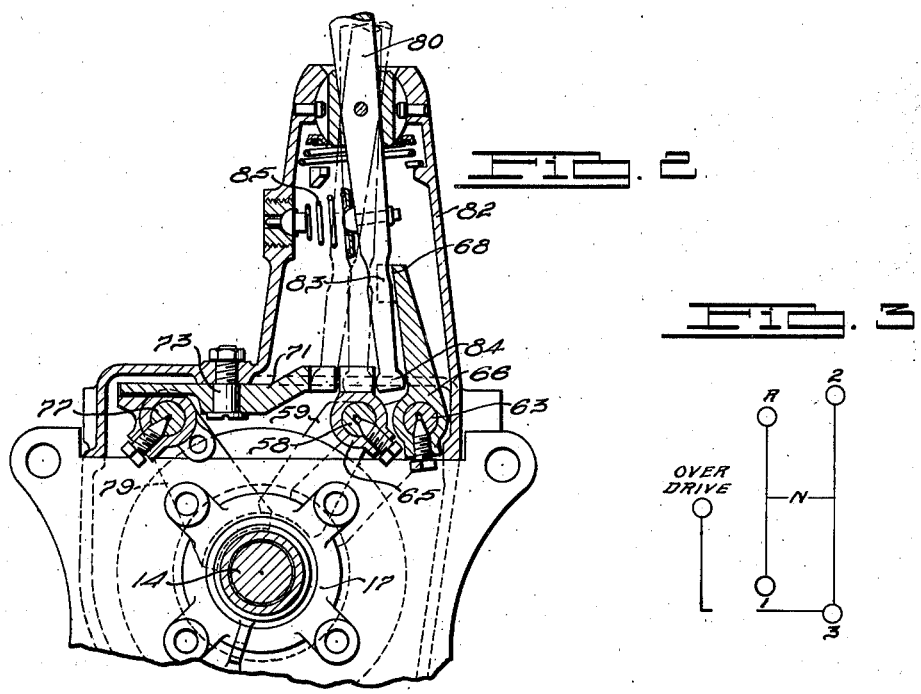
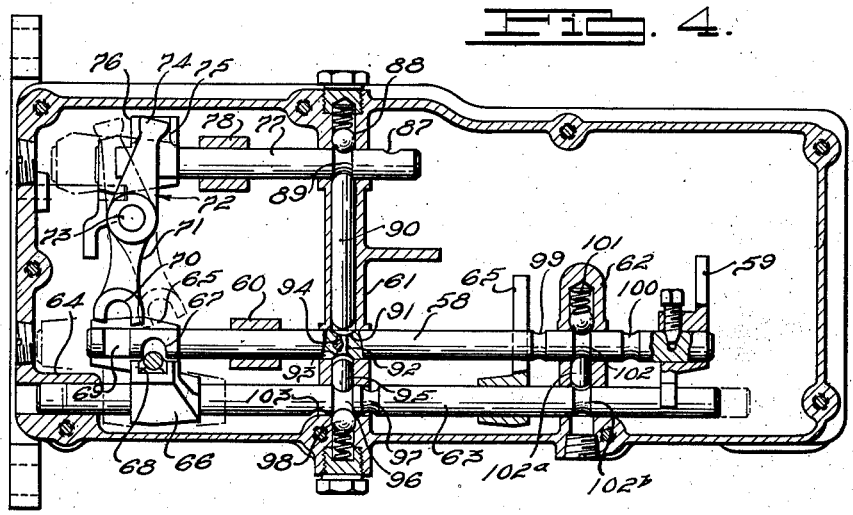
INVENTOR
Edwin R. Maurer.
BY
Harness, Dind, Patee & Harris
ATTORNEYS.

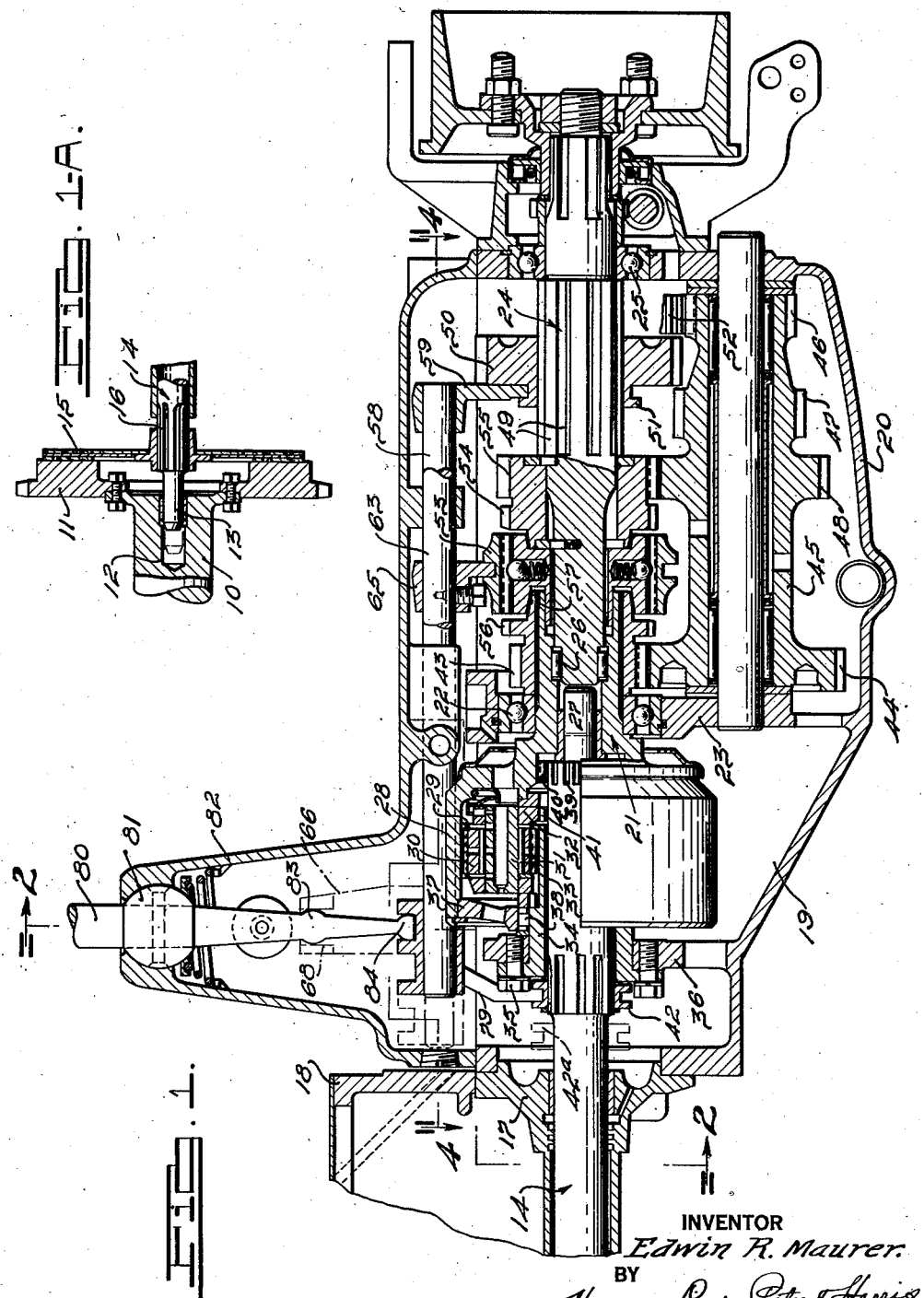

Patented Nov. 15, 1938

2,136,721

UNITED STATES PATENT OFFICE 2,136,721

POWER TRANSMISSION

Edwin R. Maurer, Detroit, Mich., assignor to Chrysler Corporation, Highland Park, Mich., a corporation of Delaware Application July 15, 1935, Serial No. 31,343

15 Claims. (Cl. 74—328)

This invention relates to power transmissions and refers more particularly to improvements in transmissions for driving motor vehicles.

One object of my invention is to provide an improved mechanism for obtaining an overdrive of the vehicle, or a drive between driving and driven shafts at a ratio greater than a direct or 1 to 1 drive.

A further object of my invention is to provide an efficient, quiet, and simply constructed overdrive capable of manufacture at relatively low cost and adapted to operate over a long period of use such as is desirable over the life of motor vehicle usage.

Another object of my invention is to provide an improved control for overdrive devices, such control preferably being manually operable.

More particularly, and with respect to more limited objects and advantages of my invention, I have provided an overdrive mechanism adapted for use with a conventional type of selective gear transmission wherein the usual gear shift lever is arranged for a novel control of my overdrive. In its broader aspects, however, my invention is not limited to any particular type of transmission employed in the vehicle drive.

I preferably arrange my overdrive in the line of transmission of power from the usual engine to the vehicle driving wheels so that it is ahead of the speed ratio changing device instead of rearwardly thereof. This has the advantage that, among other things, the overdrive mechanism is not required to transmit torque in excess of that developed by the engine and consequently the overdrive parts may be made relatively lighter and less rugged than would be the case where the overdrive is subjected to torque in excess of that developed by the engine.

In addition, I have provided an improved control for the overdrive which requires the operator to set the transmission for direct drive prior to manipulating the overdrive, such control further automatically releasing the overdrive whenever the operator manipulates the transmission for any gear ratio drive (including direct drive) subsequent to a condition of overdriving for the vehicle. The overdrive cannot therefore be accidentally left in operative condition.

I have further provided a novel arrangement of safety controls interconnecting the overdrive mechanism with the mechanism of the transmission proper, rendering the control of the drive fool proof and subject to manipulation by a common control device such as a gear shift lever only under desired conditions of drive.

I preferably arrange my overdrive mechanism as a part of the structural organization of the transmission proper although, if desired, the overdrive may be separated therefrom or otherwise located in the line of the vehicle drive.

Further objects and advantages of my invention will be more apparent from the following detailed description of one embodiment which my invention may assume, reference being had to the accompanying drawings, in which:

Fig. 1 is a sectional elevational view longitudinally through my power driving mechanism.

Fig. 1A is a sectional elevational view of the driving mechanism forwardly of the structure shown in Fig. 1.

Fig. 2 is a transverse sectional view taken as indicated by the line 2—2 of Fig. 1.

Fig. 3 is a diagrammatic plan view of the shifting movement for the control lever.

Fig. 4 is a sectional plan view taken as indicated by the line 4—4 of Fig. 1.

Referring to the drawings, the motor vehicle is adapted to be driven by the usual engine having its driving crankshaft 10 mounting the usual flywheel 11. The crankshaft has a rearwardly opening bore 12 for slidably receiving and guiding the forwardly piloted end 13 of a driving shaft 14 coaxial with the crankshaft. A clutch of any well-known type may be provided to control the drive between crankshaft 10 and driving shaft 14, this clutch being generally represented by the driving disc 15 splined at 16 on the driving shaft 14 so that the latter may have a shifting movement in the direction of its axis relative to the clutch disc 15, the purpose of which will be presently apparent. The usual pressure plate and manual control for the clutch disc 15 is not illustrated in my drawings since these parts are of well known construction and do not in themselves form any part of my invention.

The driving shaft 14 has a bearing in the journal 17 carried by the rear wall of the clutch housing 18, the forward end of the driving shaft extending substantially through the forward overdrive compartment 19 formed as a portion of the casing structure 20 which is adapted to receive the main part of the speed ratio changing mechanism, which in the present embodiment of my invention, is illustrated as the well known type of selector gear transmission.

An intermediate shaft 21 is rotatably journaled in a bearing 22 carried by a wall 23, this intermediate shaft being coaxial with the driving shaft 14 and receiving the drive therefrom for driving the speed ratio transmission within the casing 20. The drive from this transmission is taken from a driven shaft 24 journaled in a bearing 25 for rotation coaxially with the intermediate shaft 21, the driven shaft 24 being adapted to drive the rear wheels (not shown) of the motor vehicle in the usual well known manner.

The rearwardly extending end of the intermediate shaft 21 is hollow for rotatably receiving therewithin the forwardly extending end of driven shaft 24, the bearing 26 providing a journal for these shaft portions. The hollow end of shaft 21 also slidably pilots the driving shaft 14, the latter having a reduced rear end portion 27 for this purpose.

The intermediate shaft 21 has a forwardly extending cylindrical portion 28 of enlarged diameter telescopically arranged with the rear portion of driving shaft 14 and concentric therewith, the cylindrical portion 28 being provided with an internal gear 29 meshing with a plurality of circumferentially spaced planetary gears, one of which is shown at 30 mounted on shaft 31 supported by a planet carrier assembly 32. The planetary gears 30 also mesh with a sun gear 33 formed on a hub 34 fixed by suitable fasteners 35 to a portion 36 of the casing for the overdrive compartment 19. The forward end of the cylindrical portion 28 of intermediate shaft 21 is rotatably supported on the hub 34 by reason of the spider 37 and bearing 38. It will thus be understood that the sun gear 33 is held fixed, it being apparent that if the driving shaft 14 were arranged to drive the planet carrier 32 then the planetary gears 30 will operate to drive the intermediate shaft 21 at a speed greater than that of the driving shaft 14 by an amount depending on the value of the planetary gear train.

In order to provide a selectively operable drive between driving shaft 14 and intermediate shaft 21 so that the latter may be driven from the former either in a direct or 1 to 1 drive or else at an overdrive speed ratio through the planetary gearing, I have provided a suitable clutching mechanism preferably manually operable and comprising a shiftable clutch device 39 preferably formed as a series of clutch teeth projecting from the rearward portion of the driving shaft 14. The intermediate shaft 21 is formed with the series of internal clutching teeth 40 adapted for engagement with teeth 39 when the shiftable driving shaft 14 is in its rearward position as illustrated in Fig. 1. In such instance it will be apparent that shaft 14 will transmit a two-way direct drive to shaft 21, the planetary gears 30 and carrier 32 merely rolling around the stationary sun gear 33 without transmitting any drive between shafts 14 and 21.

Carrier 32 is also provided with a series of internal clutching teeth 41 adapted for clutching engagement with the teeth 39 when the driving shaft 14 is shifted forwardly out of engagement with the teeth 40. In such instance, the drive will pass from the driving shaft 14 through teeth 39 and 41 to the carrier 32 causing the planetary gears 30 to roll around the sun gear 33 and to thereby transmit a drive to the internal gear 29, cylindrical portion 28 and intermediate shaft 21, the latter being thereby driven at a faster speed than the driving shaft 14 as aforesaid. For the purpose of selectively shifting the driving shaft 14 to effect the aforesaid selective engagement of clutching teeth 39 with the teeth 40 or 41, the driving shaft 14 is provided with a shift collar 42 so that when the shaft is shifted forwardly this collar will occupy a position indicated by the dotted lines 42ª in Fig. 1 as will be presently apparent.

The drive received by the intermediate shaft 21 passes to the driven shaft 24 preferably through a series of selectively operable speed ratios including low gear, intermediate gear, direct or 1 to 1, and reverse. I have illustrated a more or less conventional transmission mechanism for effecting these gear ratio drives and therefore these will only be briefly referred to as follows.

Shaft 21 has fixed thereto a countershaft driving gear 43 meshing with gear 44 of the countershaft 45, the latter having a reverse drive pinion 46, a low speed driving gear 47, and an intermediate driving gear 48. The driven shaft 24 is splined at 49 to slidably receive the low speed and reverse driven gear 50 adapted for sliding movement along splines 49 by reason of a shifting clutch collar 51. It will be apparent that when the gear 50 is moved forwardly into mesh with the countershaft gear 47, the driven shaft 24 will receive a low gear ratio drive from the shaft 21 and when the gear 50 is moved rearwardly into mesh with the usual reverse idler gear 52 (which is in constant mesh with the countershaft gear 46), then the shaft 21 will transmit a reverse drive to the driven shaft 24.

The direct drive and the intermediate drive for driven shaft 24 may be obtained in the generally customary manner, the shaft 24 having drivingly secured thereto the shiftable clutch member 53 adapted to selectively mesh with the clutching teeth 54 of the intermediate drive gear 55 which is in constant mesh with countershaft gear 48, or else when the clutch member 53 is shifted forwardly for direct drive then the clutch is adapted for driving engagement with the teeth 56 carried with the aforesaid gear 43. In the drawings, the clutch 53 is illustrated as having associated therewith a well known form of synchronizing clutching device 57 adapted on initial shifting of the clutch 53 to frictionally contact with the hubs of gears 43 and 55 prior to the aforesaid positive clutching engagement of the teeth of clutch 53 with the clutch teeth 56 and 54, respectively.

I will now describe my mechanism for manually selectively controlling the drive between driving shaft 14 and driven shaft 24, this drive being preferably controlled so that the overdrive cannot be manipulated into operation except under certain predetermined desired conditions of the gearing for the main portion of the transmission, my invention further providing a novel system of interlocking control for the various drives preferably under control of a common manually operable member in the form of a gear shift lever.

The low speed and reverse gear 50 is connected to the shifter rail 58 by the fork 59 engaging the collar 51, this rail being slidably guided by the supports 60, 61 and 62.

A second rail 63 is slidably mounted in guides 64, 61 and 62 and is adapted to control the intermediate and direct drive positions of the shiftable clutch 53 through a fork 65 interconnecting this rail with clutch 53. The rails 58 and 63, adjacent their forward end portions, are respectively provided with the shifter blocks or forks 65' and 66. The block 65' has a laterally extending recess 67 opening toward a recess 68 in the block 66 and when the transmission is in neutral as illustrated in the drawings, these recesses 67 and 68 are directly laterally opposite one another although it will be noted from Fig. 2 that the recess 68 in the block 66 may be at a relatively higher elevation for greater leverage and lesser amount of travel of the rail 63 in comparison with the rail 58 when engaged by the common gear shifter lever which will be presently referred to. The block 65' has a passageway or slot 69 extending across its upper face, this passageway being so located that it lies laterally opposite lever end 84 when lever portion 83 is in its position for direct drive control. When the transmission parts are in the positions illustrated in the drawings, then at such time the passageway 69 is also laterally opposite the opening 70 of the arm portion 71 of a bellcrank lever 72 pivotally mounted at 73 to an upper wall of the transmission casing as best seen in Fig. 2. This bellcrank lever has an oppositely extending arm 74 having the outer rounded end thereof engaged in the opening 75 of a block 76 mounted on a third rail 77 slidable in the direction of the aforesaid rails 58 and 63 and guided for such movement in the supports 78 and 61. The block 76 carries a fork 79 which operates in the aforesaid collar 42 of the shiftable driving shaft 14.

In order to selectively control the shifting movements of rails 58, 63 and 77, I have provided a gear shift lever 80 mounted at 81 for lateral and longitudinal rocking adjusting movements in a supporting tower 82. The lever 80 has an operating end extending downwardly in the tower 82 below the lever pivot 81 to provide the actuating lever portions 83 and 84. If desired a spring 85 may be arranged to act on the lever 80 tending to yieldingly urge the lever ends 83 and 84 toward engagement with recess 68 and free from engagement with recess 67 respectively so that when the transmission is in neutral the shifter lever is positioned in engagement with the second and third speed rail 63 whereby the reverse rail will not be accidentally operated. Furthermore, the spring 85 will act to assist in the longitudinal shifting movements of lever 80 in operating the rails as soon as the shift lever starts its shifting movement as more particularly described and claimed in the application of Carl A. Neracher, Serial No. 756,194, filed December 6, 1934.

Before describing my novel system of interlocking control for the shifter rails 58, 63 and 77 I will briefly describe the manipulation of the gear shift lever 80 for selectively operating these rails. With the transmission in the position for neutral drive, and when it is desired to drive the vehicle forwardly in the low gear, the operator moves the shifter lever 80 so as to swing the operating end 84 laterally into engagement with the recess 67 of rail 58 and then the lever 80 is rocked longitudinally to effect a forward movement of rail 58 in bringing gear 50 into mesh with gear 47.

When it is desired to drive the vehicle in second or intermediate gear, the operator returns the rail 58 to the position shown in Fig. 4 and then the lever 80 is rocked so that the shifter portion 83 is brought into engagement with the recess 68 of the rail 63. The lever 80 is then moved to slide the rail 63 rearwardly to engage clutch 53 with teeth 54.

When a direct drive through the transmission is desired, the shifter lever 80 is left in engagement with recess 68 and rail 63 is moved forwardly to engage clutch 53 with the teeth 56.

When a reverse drive is desired, the rail 63 is returned to the neutral position and the shifter lever 80 is operated so that the lever end 84 picks up the rail 58 which is then moved rearwardly to engage gear 50 with the reverse idler 52.

In the foregoing illustration of the operation of the gear shift lever 80, it has been presumed that these different speeds were desired in sequential operation although it will be readily understood that the gear shift lever may be manipulated out of the particular sequence of operation given in the above illustration.

It will be noted that when the rail 63 is operated forwardly to provide a direct drive through the transmission by engaging clutch 53 with clutch 56, then at such time the recess 68 of rail 63 is brought opposite the passage 69 in rail 58, it being understood that rail 58 during the third speed drive is in its neutral position illustrated in Fig. 4. Thus when the transmission is set for direct drive, the recesses 68 and 70 as well as the passage 69 are all brought in transverse alignment so that at this time the operator may manipulate the shifter lever 80 with a lateral rocking motion to swing the operating end 84 out of the recess 68 and directly across passageway 69 to engagement with the recess 70 of bellcrank lever 72. In such position, the shifter lever may then be rocked in a longitudinal direction to cause the bellcrank arm 74 to move the rail 77 forwardly to disengage teeth 39 and 40 and to bring teeth 39 into clutching engagement with teeth 41 to effect a drive through the planetary gearing whereupon the driven shaft 21 will drive faster than the driving shaft 14 and this drive will pass directly to the driven shaft 24 for obtaining an overdrive relatively between shafts 24 and 14. Thus by reason of the arrangement of the shifter rails and recesses thereof it is necessary to first manipulate the transmission into the direct drive condition for the speed ratio mechanism in the main portion of the casing 20, prior to manipulating the gear shifter lever 80 to obtain the overdrive.

Furthermore, it will be noted that before the overdrive can be rendered inoperative as in the process of shifting to some other speed ratio drive or neutral, the shifter lever 80 must first be actuated out of the recess 70 and back to the recess 68 of the rail 63, the latter control being presently more particularly apparent from the following description of the interlocking control for the rails.

Referring now to the system of interlocking control, the overdrive rail 77 has spaced notches 87 and 89 respectively for engagement with a spring pressed ball detent 88 when the rail 77 is positioned rearwardly for engaging clutch teeth 39 and 40 and forwardly for engaging clutch teeth 39 and 41. The notch 89 is of annular formation for engagement with a plunger 90 slidable in the support 61.

The rail 58 has a recess 91 which is adapted to receive an end of plunger 90 when the rail is in its neutral position. A small plunger 92 is carried by rail 58 and operates between recess 91 and a second recess 93. Plunger 92 is guided by a pin 94 and is arranged so that the plunger may project selectively from either of the recesses 91 or 93. The support 61 has a further plunger 95 adapted for selective movement into recess 93 and into the annular recess 96 and 97 of rail 63, these recesses being also engaged by a spring pressed ball detent 98. The positions of controlling movement of shaft 58 are determined by recesses 99 and 100 adapted for selective engagement by a spring pressed ball detent 101, a further recess 102 being provided in rail 58 for engagement with the ball 101 when the rail 58 is in its neutral position.

Guide 62 accommodates a slidable plunger 102ᵃ engageable with a groove 102ᵇ of rail 63, this plunger being moved when either rail 58 or 63 is shifted to provide an interlock between these rails.

In operation of the interlocking mechanism, let it be assumed that the parts are in their neutral positions and that the operator shifts the rail 58 forwardly for low speed by engaging gear 50 with countershaft gear 47. Such forward movement of rail 58 is accompanied by a separating movement of plungers 90 and 95 into the respective recesses 89 and 96 whereby rails 77 and 63 are held against accidental movement. During this movement the small plunger 92 occupies a position within the rail 58. The ball detent 101 will also engage the rail recess 100 to advise the operator of the proper forward shifting of the rail and to also assist in maintaining the rail in the desired position during low speed drive and plunger 102ᵃ will be moved to engage groove 102ᵇ to prevent an accidental movement of rail 63 while shifting rail 58.

With rail 58 shifted forwardly as aforesaid, the shifter lever 80 cannot be moved laterally to pick up either of the other rails since recess 68 of rail 63 is no longer aligned laterally with recess 67 and the inner wall of recess 67 will prevent the shifter end 84 from moving inwardly to the recess 70 of the bellcrank lever 72 for operating rail 77. With rail 58 moved forwardly, the shifter lever 80 cannot be rocked out of recess 67 because in such position the lever portion 83 will strike the upper end of block 66 adjacent recess 68. Furthermore, the separating movement of plungers 90 and 95 will prevent any accidental displacement of rails 63 or 77.

On return of rail 58 to the neutral position, the shifter lever 80 may be manipulated either to move the rail 58 rearwardly to engage ball detent 101 with recess 99 accompanied by a separating movement of plungers 90 and 95 to effect a reverse drive or else the shifter lever may be manipulated to move the lever actuating portion 83 into engagement with recess 68 of the rail 63. In the latter instance, the rearward movement of rail 63 to engage clutch 53 with teeth 54 for the intermediate drive will cause the ball detent 98 to engage a recess 103 in rail 63 accompanied by an inward movement of plunger 95 to lock the rail 58. Plunger 102ᵃ will also hold rail 58 against accidental movement. This movement of plunger 95 will also act through the small plunger 93 to move the plunger 90 into engagement with recess 89 whereby to lock the overdrive shift rail 77 against accidental movement.

Let it now be presumed that the rail 63 is moved forwardly to provide a direct drive between clutch 53 and teeth 56, the ball detent 98 registering with recess 97 of rail 63. In such instance, the plunger 95 may move outwardly into the recess 97 and plungers 90 and 92 may also move in the same direction when the rail 77 is moved forwardly. During forward movement of rail 63, plunger 102ᵃ will be held in recess 102 thereby locking rail 58 until rail 63 is returned to neutral. To effect this forward movement of rail 77, and with rail 63 in its said forward position of direct drive, the operator swings lever 80 laterally to engage lever end 84 with the recess 70 of bellcrank lever 72 followed by a longitudinal movement of the shifting lever to swing the bellcrank lever to the dotted line position shown in Fig. 4 in order to move rail 77 to register recess 87 with ball detent 88. Such movement will shift shaft 14 forwardly to engage teeth 39 with teeth 41 and the overdrive will thus be effected from shaft 14 to intermediate shaft 21 and thence directly to driven shaft 24. With the parts in such position it will be noted that the said forward movement of rail 77 will move plunger 90 into recess 91 of rail 58, plunger 92 also operating to move plunger 95 into engagement with recess 96 whereby the rails 58 and 63 will be held fixed against accidental shifting movement.

With the overdrive in operation, it will be noted that before any other speed ratio can be operated by the shifter lever 80 the latter must be moved longitudinally to return the shifter rail 77 to the position illustrated in Fig. 4, accompanied by movement of the rail 63 to the neutral or second speed. Thus, when the shifter lever end 84 is being moved out of overdrive from recess 70 toward recess 68 of rail 63, it is not possible to stop the shifter lever to cause the shifter portion 84 to pick up rail 58 at recess 69 and move the rail 58 either forwardly or rearwardly because plunger 102ᵃ will hold rail 58 until rail 63 is shifted to register groove 102ᵇ with the plunger 102ᵃ.

When the end 84 of the shifter lever is being moved in either direction between recesses 68 and 70 rail 58 cannot be moved when lever end 84 momentarily engages passage 69 because plunger 102ᵃ will hold this rail, the rail 63 having been moved to carry groove 102ᵇ away from registration with this plunger.

In Fig. 3 I have diagrammatically illustrated the movement of the upper end of shifter lever 80, it being apparent that the movement of the inner end of the shifter lever at actuating portions 84 and 83 is just the opposite of this movement because of the fact that the lever is pivoted intermediate its ends.

What I claim is:

1. In a motor vehicle drive, a driving shaft, a second shaft axially aligned with said driving shaft and adapted to be driven therefrom, a third shaft axially aligned with said second shaft and adapted to be driven therefrom for driving the vehicle, means for selectively driving said third shaft from said second shaft in a plurality of speed ratios, and means for selectively driving said second shaft from said driving shaft in a direct drive or in a speed ratio differing therefrom, said second shaft having an enlarged extension surrounding an end portion of said driving shaft, said driving means for said second shaft including a gear train adapted to drivingly connect said driving shaft with said shaft extension, said driving means for said second shaft further including clutching means selectively operable to connect said driving shaft with said second shaft either directly or indirectly through said gear train.

2. In a power transmission for driving a motor vehicle, a driving shaft adapted to be driven by the engine, a second shaft, means for selectively driving said second shaft from said driving shaft in direct drive and at a speed greater than that of said driving shaft, a third shaft adapted to transmit a drive to the motor vehicle, means for selectively driving said third shaft from said second shaft in direct drive, reverse, and at one or more speeds less than that of said second shaft, manually operable means for operating said selective driving means for said second and third shafts, and a single manually operable shifter member for manipulating said manually operable means in response to shifting movements of said shifter member to selectively provide said selective driving means for said second and third shafts.

3. In a motor vehicle transmission, a driving shaft, a driven shaft, means including a plurality of gear trains for drivingly connecting said shafts to provide therebetween an overdrive, a forward direct and a plurality of forward reduction drives, and a reverse drive, a shifter lever, means responsive to movement of said shifter lever in substantially an H-shaped path of movement for selectively controlling said forward and reverse drives, and means responsive to movement of said shifter lever transversely of said H-shaped path of movement adjacent one end thereof from one side of said H-shaped path to the other and then longitudinally along one side thereof toward the other end of said H-shaped path for controlling said overdrive.

4. In a transmission for motor vehicle drive control, a driving shaft, a driven shaft, a shaft intermediate said driving and driven shafts and axially aligned therewith, means selectively drivingly connecting said intermediate shaft with one of the two first mentioned shafts providing a direct drive and a reverse drive therebetween, a reverse drive control rail, a direct drive control rail, means for mounting said rails for relative sliding movement adjacent each other, a manually operable shift lever selectively engageable with said rails for imparting sliding movement thereto, means selectively drivingly connecting said intermediate shaft with the other of the two first mentioned shafts providing a direct drive and a speed ratio drive therebetween, a third control rail for controlling the second said direct drive and said speed ratio drive, means for mounting said third control rail for sliding movement adjacent said reverse and direct drive control rails, said reverse control rail having a slot accommodating movement of one end of said shift lever transversely of said reverse control rail from a position of shift lever engagement with said direct drive control rail, said slot being disposed to accommodate said transverse movement of said shift lever end only when said direct drive control rail is slidably positioned to provide the first said direct drive, and means providing an operative connection between said shift lever and said third control rail when said shift lever is operated to move said end thereof transversely in said slot as aforesaid.

5. In a transmission for motor vehicle drive control, a driving shaft, a driven shaft, a shaft intermediate said driving and driven shafts and axially aligned therewith, means selectively drivingly connecting said intermediate shaft with one of the two first mentioned shafts providing a direct drive and a reverse drive therebetween, a reverse drive control rail, a direct drive control rail, means for mounting said rails for relative sliding movement adjacent each other, a manually operable shift lever selectively engageable with said rails for imparting sliding movement thereto, means selectively drivingly connecting said intermediate shaft with the other of the two first mentioned shafts providing a direct drive and a speed ratio drive therebetween, a third control rail for controlling the second said direct drive and said speed ratio drive, means for mounting said third control rail for sliding movement adjacent said reverse and direct drive control rails, said reverse control rail having a slot accommodating movement of one end of said shift lever transversely of said reverse control rail from a position of shift lever engagement with said direct drive control rail, said slot being disposed to accommodate said transverse movement of said shift lever end only when said direct drive control rail is slidably positioned to provide the first said direct drive, and a lever operably connected to said third control rail and adapted for operative engagement with said shift lever when said end thereof is moved transversely in said slot as aforesaid.

6. In a transmission for motor vehicle drive control, a driving shaft, a driven shaft, a shaft intermediate said driving and driven shafts and axially aligned therewith, means selectively drivingly connecting said intermediate shaft with said driven shaft providing a direct drive and a reverse drive therebetween, slidably mounted direct and reverse drive control rails, a manually operable shift lever selectively engageable with said rails for imparting sliding movement thereto, means selectively drivingly connecting said driving shaft with said intermediate shaft providing a direct drive and an overdrive therebetween, a slidably mounted overdrive control rail, said reverse drive control rail being disposed between said direct drive control rail and said overdrive control rail, said control rails being so constructed and arranged as to accommodate movement of said shift lever from a position of engagement with said direct drive control rail to a position for actuating said overdrive control rail when said direct drive control rail is moved by said shift lever to provide the first said direct drive.

7. In a transmission for motor vehicle drive control, a driving shaft, a driven shaft, a shaft intermediate said driving and driven shafts and axially aligned therewith, means selectively drivingly connecting said intermediate shaft with one of the two first mentioned shafts providing a direct drive and a reverse drive therebetween, a reverse drive control rail, a direct drive control rail, means for mounting said rails for relative sliding movement adjacent each other, a manually operable shift lever having an operating end engageable with said reverse control rail for imparting sliding movement thereto, said direct drive control rail having a projection adapted for engagement by an intermediate portion of said shift lever for imparting sliding movement to said direct drive control rail, means selectively drivingly connecting said intermediate shaft with the other of the two first mentioned shafts providing a direct drive and a speed ratio drive therebetween, a third control rail for controlling the second said direct drive and said speed ratio drive, means for mounting said third control rail for sliding movement, said reverse control rail being disposed intermediate said direct drive control rail and said third control rail, said control rails being so constructed and arranged as to accommodate movement of said shift lever from a position of engagement with said direct drive control rail to a position for actuating said third control rail when said direct drive control rail is moved by said shift lever to provide the first said direct drive.

8. In a motor vehicle transmission, driving and driven shafts, means including a plurality of gear trains for selectively drivingly connecting said shafts for transmitting a plurality of drives from said driving shaft to said driven shaft, a manually operable selector element, means for mounting said selector element for selective shifting movements of an end portion thereof in a substantially H-shaped path and in a further path transversely of said H-shaped path adjacent one end thereof from one side of said H-shaped path to the other and then longitudinally along said other side toward the other end of said H-shaped path, and means responsive to said shifting movements of said end portion of said selector element in said paths for selectively controlling said drives.

9. In a motor vehicle transmission, driving and driven shafts, means including a plurality of gear trains for selectively drivingly connecting said shafts for transmitting a plurality of drives from said driving shaft to said driven shaft, a manually shiftable selector element, three longitudinally shiftable rails having their longitudinal axes disposed substantially parallel with each other whereby to position a pair of said rails outwardly at opposite sides of the remaining intermediate rail, means for mounting said rails for relative shifting movements along their axes for providing said drives, means operable in response to selective shifting movements of said selector element for establishing selective operative connections between said selector element and each of said rails, and means preventing the establishment of said operative connection with one of said outer rails until the other of said outer rails has been shifted by said selector element to a position providing one of said drives.

10. In a motor vehicle transmission, driving and driven shafts, means including a plurality of gear trains for selectively drivingly connecting said shafts for transmitting a plurality of drives from said driving shaft to said driven shaft, a manually shiftable selector element, three shifter rails having their longitudinal axes disposed substantially parallel with each other whereby to position a pair of said rails outwardly at opposite sides of the remaining intermediate rail, means for mounting said rails for relative shifting movements along their axes for providing said drives, said intermediate rail having a neutral position in its shifting movement, means operable in response to selective shifting movements of said selector element for establishing selective operative connections between said selector element and each of said rails, and means preventing the establishment of said operative connection with one of said outer rails until the other of said outer rails has been shifted by said selector element to a position providing one of said drives with said intermediate rail remaining in its neutral position.

11. The combination with a transmission having low, second, high, and reverse gearing drive, and an overspeed drive, of a shift lever, means operated by said shift lever for shifting said gearing to effect said low, second, high, and reverse drive, and means positioned to be engaged by said lever when moved to a position to the front of low speed drive position of said lever for operating said gearing to effect the overspeed drive.

12. The combination with a transmission having low, second, high, and reverse gearing drive and an overspeed gearing drive, of a shift lever, means operated by said lever for shifting said gearing to effect said low, second, high, and reverse gear drive, a rocking arm positioned to be engaged by a shift of said lever to the left from high speed position and rocked by a movement of said lever to the front from high speed position to shift said overspeed gearing to effect the overspeed drive.

13. The combination with a transmission having low, second, high, and reverse gearing drive and an overspeed gearing drive, of a pair of shift forks arranged side by side, a shift lever movable transversely from an intermediate position to selectively engage either of said shift forks and movable longitudinally to shift either of said forks, means disposed laterally beyond the axes of both of said shift forks adapted to be engaged by a transverse movement of said shift lever when the same is moved out of engagement with one of said shift forks after having shifted the same and moved by movement of the shift lever in the opposite shifting direction to operate said overspeed gearing to effect the overspeed drive.

14. The combination with a transmission for low, second, high, and reverse gearing drive and an overspeed gearing drive, of a pair of shift rails, shifting forks mounted on said shifting rails and axially movable to shift said second, high, low, and reverse gearing, a shift lever transversely shiftable into engagement with either of said forks, an operating member disposed laterally beyond both of said shift rails and engaged by said shift lever when the same is moved transversely out of engagement with one of said shift forks and operated by movement of said shift lever in the direction opposite to which it has operated said shift fork to operate said overspeed gearing to effect the overspeed drive.

15. The combination with a transmission having low, second, high, and reverse gearing drive and having an overspeed drive, of a shift fork for controlling said overspeed drive, a shift rail on which said shift fork is mounted, a shifting lever associated with means for shifting said low, second, high, and reverse gearing, an operating arm extending into the path of said shift lever and connected with said shift rail and engaged by said shift lever by movement of the same in a direction opposite to the high speed direction shift to render said overspeed drive effective.

EDWIN R. MAURER.